United States Patent
Lourentzou et al.

(10) Patent No.: US 11,151,175 B2
(45) Date of Patent: Oct. 19, 2021

(54) ON-DEMAND RELATION EXTRACTION FROM TEXT

(71) Applicant: International Business Machines Corporation, Armonk, NY (US)

(72) Inventors: Ismini Lourentzou, Urbana, IL (US); Anna Lisa Gentile, San Jose, CA (US); Daniel Gruhl, San Jose, CA (US); Alfredo Alba, Morgan Hill, CA (US); Chris Kau, Mountain View, CA (US); Chad DeLuca, Morgan Hill, CA (US); Linda Kato, San Jose, CA (US); Petar Ristoski, San Jose, CA (US); Steven R. Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 16/140,315

(22) Filed: Sep. 24, 2018

(65) Prior Publication Data
US 2020/0097597 A1  Mar. 26, 2020

(51) Int. Cl.
*G06F 17/00* (2019.01)
*G06F 16/31* (2019.01)
(Continued)

(52) U.S. Cl.
CPC ........ *G06F 16/313* (2019.01); *G06F 16/3347* (2019.01); *G06F 40/211* (2020.01); *G06N 3/0481* (2013.01); *G06N 3/08* (2013.01)

(58) Field of Classification Search
CPC .. G06F 16/313; G06F 16/3347; G06F 40/211; G06N 3/0481; G06N 3/08
See application file for complete search history.

(56) References Cited

U.S. PATENT DOCUMENTS 7,475,010 B2   1/2009  Chao
8,280,719 B2  10/2012  Miller
(Continued)

OTHER PUBLICATIONS

Muzaffar, A. W. et al.; "A Hybrid Approach to Extract and Classify Relation From Biomedical Text", IKE'15 14th International Conference On, Jul. 2015, pp. 17-23, Research Gate, United States.
(Continued)

*Primary Examiner* — Tyler J Torgrimson
(74) *Attorney, Agent, or Firm* — Sherman IP LLP; Kenneth L. Sherman; Steven Laut

(57) ABSTRACT

One embodiment provides a method for on-demand relation extraction from unstructured text that includes obtaining a text corpus of domain related unstructured text. Representations of the unstructured text that capture entity-specific syntactic knowledge are created. Initial user seeds of informative examples containing relations are received. Extraction models in a neural network are trained using the initial user seeds. Performance information and a confidence score are provided for each prediction for each extraction model. A next batch of informative examples are identified for annotation from the text corpus based on training a neural network classifier on a pool of labeled informative examples. Stopping criteria is determined based on differences of the performance information and the confidence score in relation to parameters for each extraction model. Based on the stopping criteria, it is determined whether to retrain a particular extraction model after the informative examples have been labeled.

20 Claims, 9 Drawing Sheets

(51) Int. Cl.
G06N 3/04 (2006.01)
G06N 3/08 (2006.01)
G06F 16/33 (2019.01)
G06F 40/211 (2020.01)

(56) References Cited

U.S. PATENT DOCUMENTS

| | | | |
|---|---|---|---|
| 8,370,128 | B2 | 2/2013 | Brun et al. |
| 8,918,348 | B2 | 12/2014 | Nie et al. |
| 9,037,452 | B2 | 5/2015 | Fan et al. |
| 9,043,339 | B2 | 5/2015 | Ikawa et al. |
| 9,177,051 | B2 | 11/2015 | Pollara |
| 9,501,505 | B2 | 11/2016 | Bayliss |
| 9,536,522 | B1* | 1/2017 | Hall .................... G06N 5/02 |
| 9,672,205 | B2 | 6/2017 | Miller |
| 9,792,549 | B2 | 10/2017 | Bornea et al. |
| 10,364,662 | B1* | 7/2019 | Basu .................. G06N 20/00 |
| 10,902,162 | B2* | 1/2021 | Morgan ............. G06F 30/20 |
| 2012/0310864 | A1 | 12/2012 | Chakraborty et al. |
| 2017/0032273 | A1* | 2/2017 | Ho ...................... G06N 7/005 |
| 2017/0060993 | A1 | 3/2017 | Pendar et al. |
| 2017/0083507 | A1* | 3/2017 | Ho ...................... G06N 3/08 |
| 2017/0193390 | A1 | 7/2017 | Weston et al. |
| 2017/0286835 | A1* | 10/2017 | Ho ................... G06F 16/367 |
| 2017/0293682 | A1 | 10/2017 | Pfeifer et al. |
| 2017/0300461 | A1 | 10/2017 | Mital et al. |
| 2017/0300565 | A1 | 10/2017 | Calapodescu et al. |
| 2018/0300314 | A1* | 10/2018 | Xie ..................... G06N 3/08 |
| 2019/0295535 | A1* | 9/2019 | Sapugay ............. G06N 5/025 |
| 2020/0057811 | A1* | 2/2020 | Seegan .............. G06F 40/253 |
| 2020/0334541 | A1* | 10/2020 | Baker ................ G06N 20/00 |

OTHER PUBLICATIONS

Sahu, S. K. et al.; "Relation Extraction From Clinical Texts Using Domain Invariant Convolutional Neural Network", BioNLP'16 15th Workshop On, Aug. 12, 2016, pp. 206-215, Association for Computational Linguistics, Germany.
Li, F. et al.; "A Neural Joint Model for Entity and Relation Extraction From Biomedical Text", BMC Bioinformatics, Mar. 31, 2017, pp. 1-11, vol. 18, No. 1, Open Access, United States.
Feng, Y. et al.; "Joint Extraction of Entities and Relations Using Reinforcement Learning and Deep Learning", Hindawi Computational Intelligence and Neuroscience, Aug. 15, 2017, pp. 1-12, Article ID 7643065.
Mell, P., et al., "The NIST Definition of Cloud Computing", National Institute of Standards and Technology Special Publication 800-145, Sep. 2011, pp. 1-7, U.S. Department of Commerce, United States.
Ang Sun et al., "Active learning for relation type extension with local and global data views," Proceedings of the 21st ACM international conference on Information and knowledge management, Oct. 2012, pp. 1105-1112, Maui, Hawaii, USA.
Nogueira Dos Santos, C. et al., "Classifying Relations by Ranking with Convolutional Neural Networks," Proceedings of the 53rd Annual Meeting of the Association for Computational Linguistics and the 7th International Joint Conference on Natural Language Processing, Jul. 26-31, 2015, pp. 626-634, China.
Dongxu, Z. et al., "Relation classification via recurrent neural network," CoRR, Dec. 25, 2015, pp. 1-11, arXiv: 1508:01006, United States.
Gabor, A. et al., "Combining Distant and Partial Supervision for Relation Extraction," Proceedings of the 2014 conference on empirical methods in natural language processing, 2014, pp. 1556-1567, United States.
Kun X., et al., Semantic Relation Classification via Convolutional Neural Networks with Simple Negative Sampling, Proceedings of the 2015 Conference on Empirical Methods in Natural Language Processing, Sep. 2015, pp. 536-540, Lisbon, Portugal.
Li Z., et al., "Unsupervised Pre-training With Sequence Reconstruction Loss for Deep Relation Extraction Models," In Proceedings of Australasian Language Technology Association Workshop, Dec. 2016, pp. 54-64, Melbourne, Australia.
Wang, L. et al., "Relation Classification via Multi-Level Attention CNNs," Proceedings of the 54th Annual Meeting of the Association for Computational Linguistics, Aug. 7-12, 2016, pp. 1298-1307, Berlin, Germany.
Fu, L. et al., "An Efficient Active Learning Framework for New Relation Types," In Proceedings of the Sixth International Joint Conference on Natural Language Processing, Oct. 2013, pp. 692-698, Japan.
Liu C., et al., "Convolution Neural Network for Relation Extraction," ADMA 2013 Part II of the Proceedings of the 9th International Conference on Advanced Data Mining and Applications, Dec. 14-16, 2013, pp. 231-242, v. 8347, Springer, Beijing China {Abstract Only}.
Sterckx, L. et al., "Using active learning and semantic clustering for noise reduction in distant supervision," 4th Workshop on Automated Base Construction at NIPS2014, 2014, pp. 1-6, United States.
Miwa, M. et al., "End-to-End Relation Extraction using LSTMs on Sequences and Tree Structures," ACL, Jun. 8, 2016, pp. 1-13, arXiv preprint arXiv:1601.00770, United States.
Xiao, M. et al., "Semantic Relation Classification via Hierarchical Recurrent Neural Network with Attention," Proceedings of the 26th International Conference on Computational Linguistics, Dec. 11-17, 2016, pp. 1254-1263, Osaka, Japan.
Vu, N.T., "Combining Recurrent and Convolutional Neural Networks for Relation Classification," NAACL 2016, May 24, 2016, pp. 1-6, arXiv preprint arXiv:1605.07333, United States.
Nguyen, T. et al., "Relation Extraction: Perspective from Convolutional Neural Networks," Proceedings of the 1st Workshop on Vector Space Modeling for Natural Language Processing, 2015, pp. 39-48, Denver, Colorado.
Nguyen, T. et al., "Employing Word Representations and Regularization for Domain Adaptation of Relation Extraction," Proceedings of the 52nd Annual Meeting of the Association for Computational Linguistics, 2014, pp. 68-74, vol. 2, Baltimore, MD.
Zhou, P. et al., "Attention-based bidirectional long short-term memory networks for relation classification," Proceedings of the 54th Annual Meeting of the Association for Computational Linguistics, Aug. 7-12, 2016, pp. 207-212, v. 2, Berlin, Germany.
Socher, R. et al., Semantic compositionality through recursive matrix-vector spaces, Proceedings of the 2012 joint conference on empirical methods in natural language processing and computational natural language learning, Jul. 12-14, 2012, pp. 1201-111, Association for Computational Linguistics, Jeju Island, Korea.
Cai, R. et al., "Bidirectional Recurrent Convolutional Neural Network for Relation Classification," Proceedings of the 54th Annual Meeting of the Association for Computational Linguistics, Aug. 7-12, 2016, pp. 756-765, v. 1, Berlin, Germany.
Yan, X., et al., "Classifying relations via long short term memory networks along shortest dependency path," In Proceedings of the 2015 conference on empirical methods in natural language processing, Aug. 15, 2015, pp. 1785-1794, arXiv preprint arXiv:1508.03720, United States.
Liu, Y., et al., "A Dependency-Based Neural Network for Relation Classification," ACL, Jul. 16, 2015, pp. 1-10, arXiv preprint arXiv:1507.04646, United States.
Shen, Y., et al., "Attention-Based Convolutional Neural Network for Semantic Relation Extraction," Proceedings of COLING 2016, the 26th International Conference on Computational Linguistics: Technical Papers, Dec. 11-17, 2016, pp. 2526-2536, Osaka, Japan.
Kim, Y., "Convolutional Neural Networks for Sentence Classification," EMNLP, Aug. 25, 2014, pp. 1-6, arXiv preprint arXiv:1408.5882, United States.
Yu, M., et al., "Factor-based compositional embedding models," NIPS Workshop on Learning Semantics. 2014, pp. 95-101, United States.
Zeng, D., et al., "Relation Classification via Convolutional Deep Neural Network," Proceedings of COLING 2014, the 25th Inter-

(56) References Cited

OTHER PUBLICATIONS national Conference on Computational Linguistics: Technical Papers, Aug. 23-29, 2014, pp. 2335-2344, Dublin, Ireland.

* cited by examiner

ON-DEMAND RELATION EXTRACTION FROM TEXT

BACKGROUND

Relation extraction aims at recognizing whether a predefined set of relations holds between two entities in a sentence. This is a crucial part of several natural language applications that need to mine structured information from text, such as knowledge base completion, social media analysis and question answering. There are many methods to extract relations of interest from free text. Several classification models have been proposed for this task. The main drawback is that they rely on human-engineered features and linguistic knowledge in the form of various Natural Language Processing operations (POS tagging, morphology, dependency parsing etc.), which make them difficult to extend to new entity-relation types, new domains and new languages.

SUMMARY

Embodiments relate to extracting relations from unstructured text. One embodiment provides for a method for on-demand relation extraction from unstructured text that includes obtaining a text corpus of domain related unstructured text. Representations of the unstructured text that capture entity-specific syntactic knowledge are created. Initial user seeds of informative examples containing relations are received. Extraction models in a neural network are trained using the initial user seeds. Performance information and a confidence score are provided for each prediction for each extraction model. A next batch of informative examples are identified for annotation from the text corpus based on training a neural network classifier on a pool of labeled informative examples. Stopping criteria is determined based on differences of the performance information and the confidence score in relation to parameters for each extraction model. Based on the stopping criteria, it is determined whether to retrain a particular extraction model after the informative examples have been labeled.

These and other features, aspects and advantages of the embodiments will become understood with reference to the following description, appended claims and accompanying figures.

DETAILED DESCRIPTION

Figure 1:
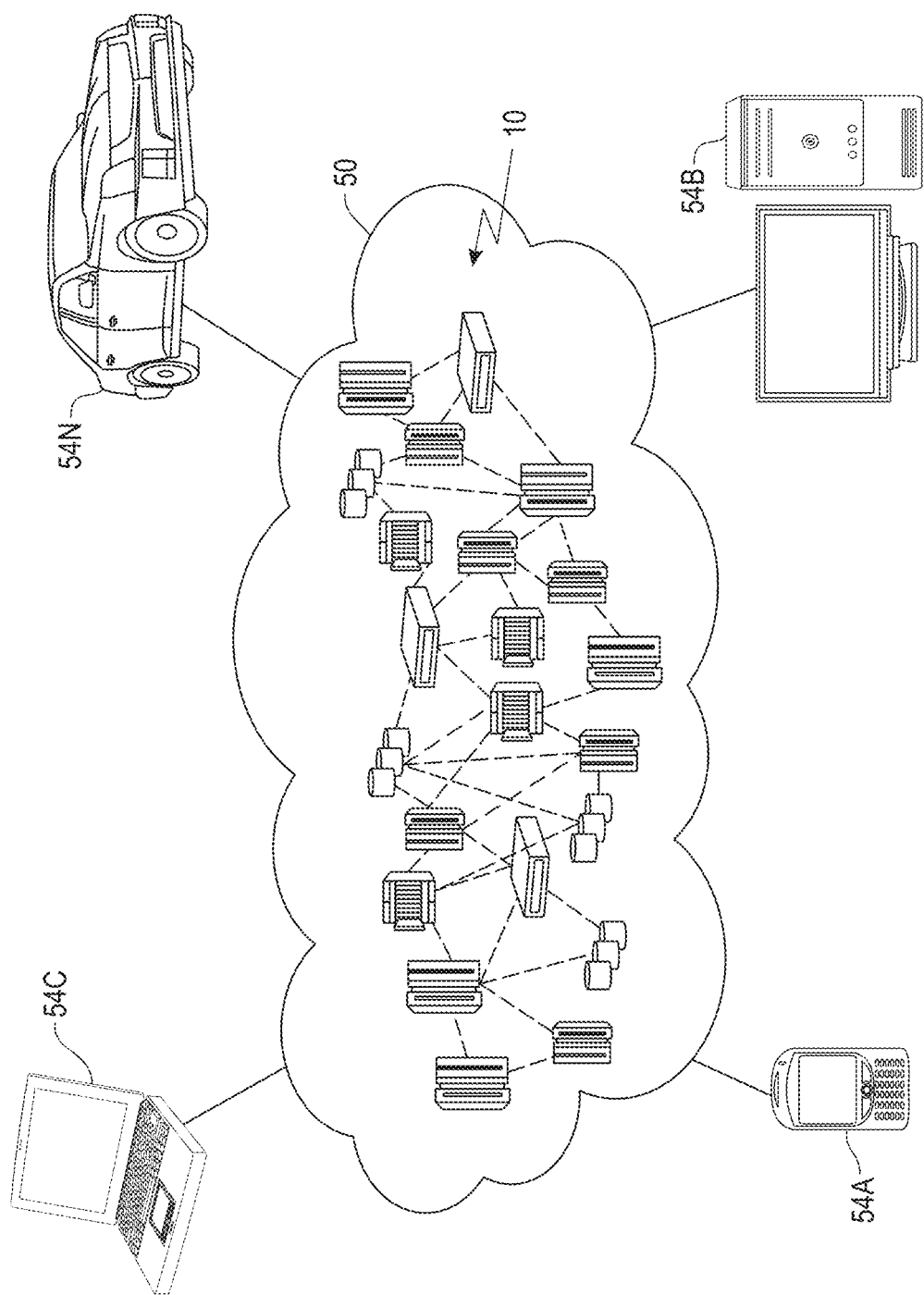
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Embodiments relate to extracting relations from unstructured text. One embodiment provides a method for on-demand relation extraction from unstructured text that includes obtaining a text corpus of domain related unstructured text. Representations of the unstructured text that capture entity-specific syntactic knowledge are created. Initial user seeds of informative examples containing relations are received. Extraction models in a neural network are trained using the initial user seeds. Performance information and a confidence score are provided for each prediction for each extraction model. A next batch of informative examples are identified for annotation from the text corpus based on training a neural network classifier on a pool of labeled informative examples. Stopping criteria is determined based on differences of the performance information and the confidence score in relation to parameters for each extraction model. Based on the stopping criteria, it is determined whether to retrain a particular extraction model after the informative examples have been labeled.

One or more embodiments find the most efficient way to query unlabeled data (e.g., user text, etc.) and learn a classifier with the minimal amount of human supervision. In one embodiment, sequential active learning (AL) is provided that includes a single instance at each iteration. When local optimization methods are used (e.g., neural networks (NNs)), it is highly unlikely for a single point to significantly impact performance. When training takes a long time (e.g., NNs), updating the (learning) model after each label is costly based on: human annotation time: waiting for the next datum to tag, time to update the model and select the next example, and computing resources. In one embodiment, curriculum learning is used to obtain first batch of examples, a neural net determines a next possible set of candidate examples, a set of active learners are used to determine to extract examples where a human (or artificial intelligence (AI)) adjudicates examples and the least effective active learner is pruned (e.g., removed, discarded, etc.), a neural and pruned set of active learners are applied, and processing stops when there is only one active learner left. One or more embodiments provide the advantages of: rapid extraction of expressed relationships and the processing is language and style independent.

Deep NNs have been used successfully on relation extraction, but the main drawback is that they require large annotated datasets for training, which can be resource "expensive" to obtain for any relation of interest. On the other hand, distant supervision assumes that all sentences found in a knowledge base that mention both entities that have previously taken part in a relation are regarded as the training instances of the same relation. This assumption, and its relaxations, has been largely exploited to alleviate the annotation processing cost, however it can introduce significant noise. Moreover, the coverage of annotations is largely dependent on the type of entities/relations: while popular relations will have good coverage, tail ones will not be represented.

Most natural language processing (NLP) applications require domain-specific knowledge, for example: (1) a dietician interested in which vitamins should be taken together or separately, or which vitamins inhibit the absorption of other vitamins; (2) creating a map of course materials, which courses to accomplish before taking the next course (this would require finding specific subtle relations between topics (subtopics, parent topic, etc.)); (3) creating summaries from company meetings automatically, where there is a need to extract information about, such as the participants, data and agenda discussion. The challenge here is to develop a system that can extract any domain specific relation, with limited data while not relying on additional linguistic knowledge, structured or textual sources.

Extracting relations from unstructured Web content is a challenging task and for any new relation a significant effort is required to design, train and tune the extraction models. In one embodiment, processing reliably generates high quality training/test data for relation extraction—for any generic user-demonstrated relation, starting from a few user provided examples and extracting valuable samples from unstructured and unlabeled Web content. To this extent one embodiment uses a strategy that learns how to identify the best order to human-annotate data, maximizing learning performance early in the process.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
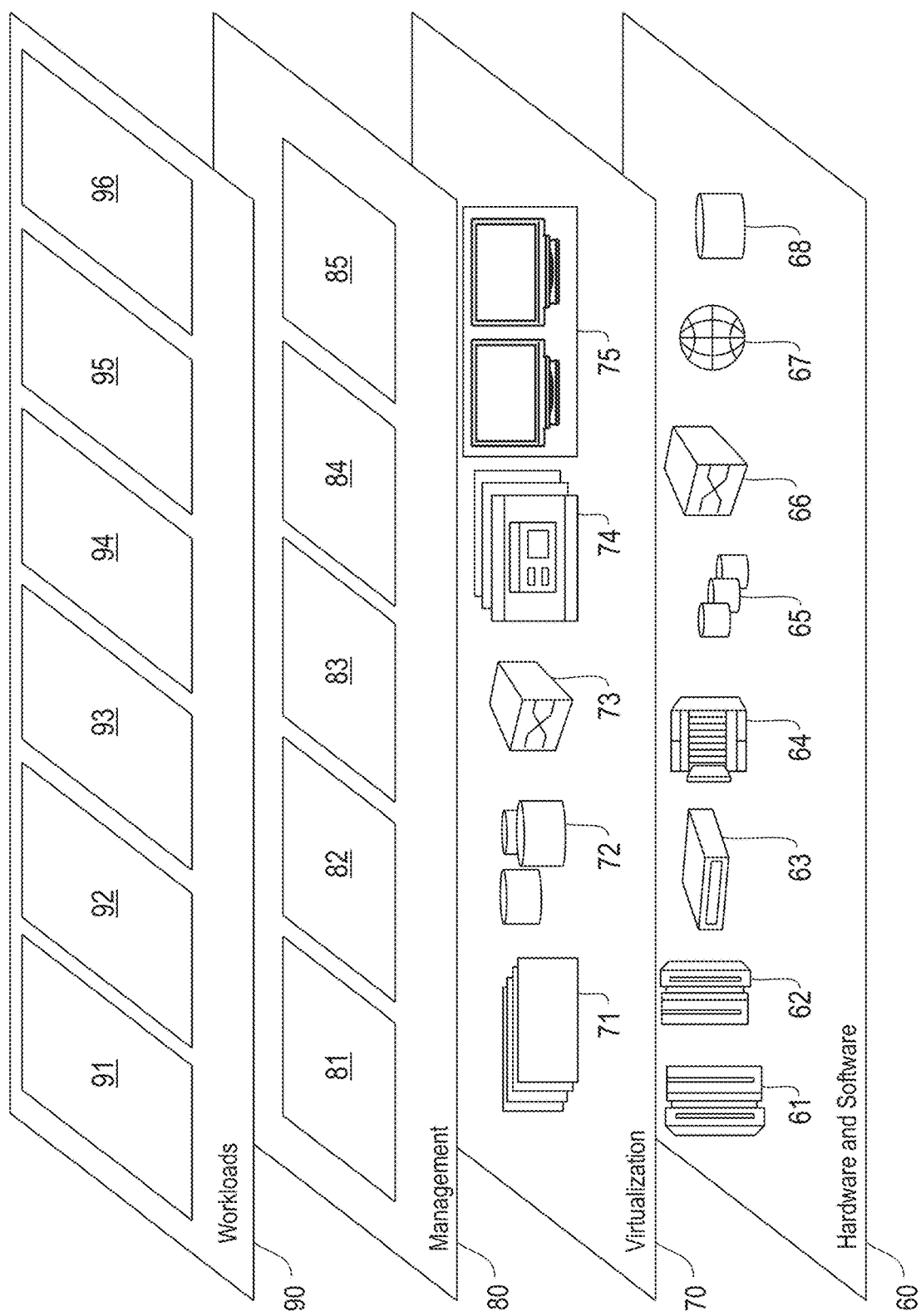
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, a management layer 80 can provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources can comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and extracting relations from unstructured text processing 96. As mentioned above, all of the foregoing examples described with respect to FIG. 2 are illustrative only, and the embodiments are not limited to these examples.

It is understood all functions of one or more embodiments as described herein can be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments can be implemented with any type of clustered computing environment now known or later developed).

Figure 3:
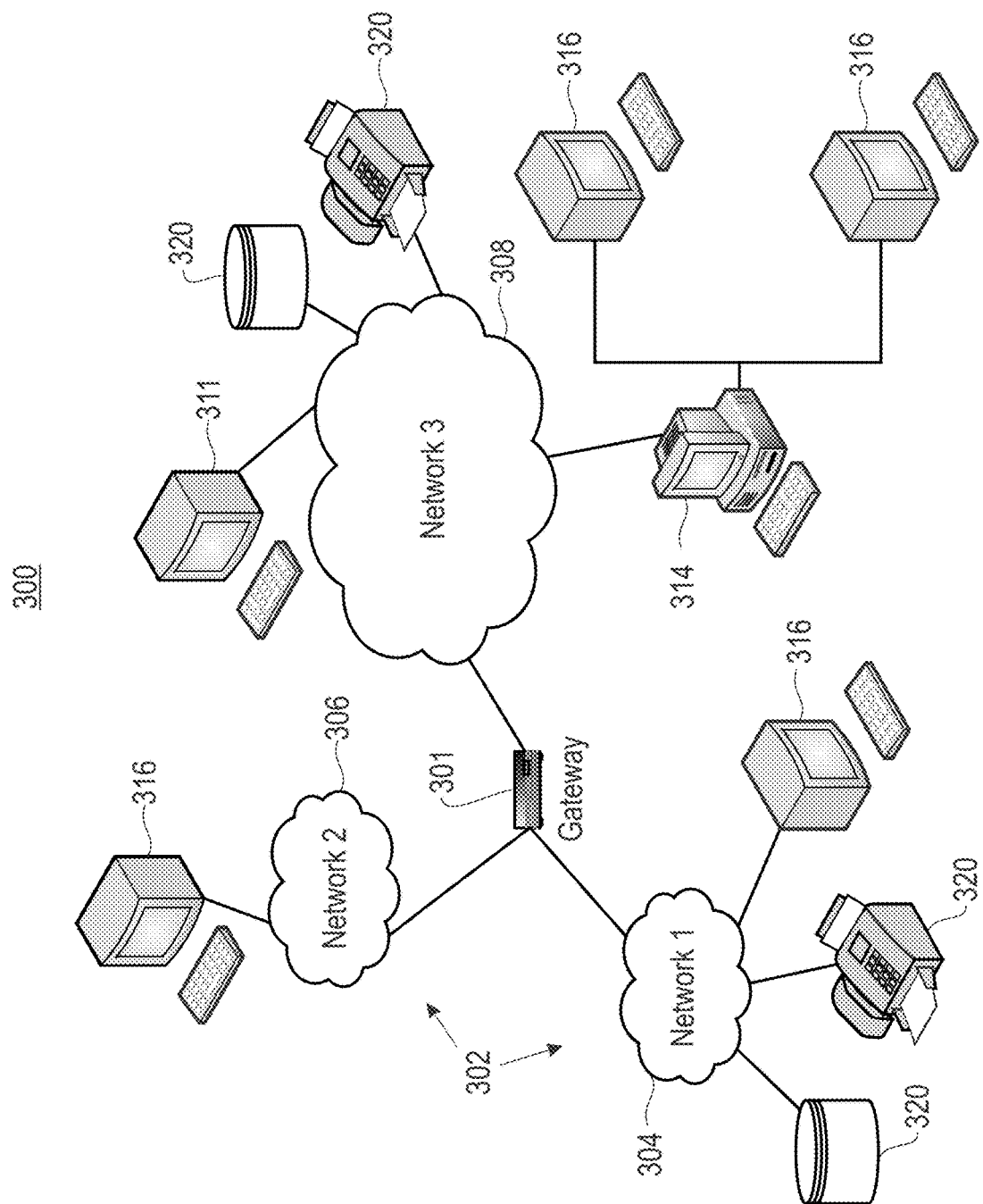
FIG. 3 is a network architecture of a system for extracting relations from unstructured text, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 can be coupled between the remote networks 302 and a proximate network 308. In the context of the present network architecture 300, the networks 304, 306 can each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 can function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 can include any type of computing device/groupware. Coupled to each data server 314 is a plurality of user devices 316. Such user devices 316 can include a desktop computer, laptop computer, handheld computer, printer, and/or any other type of logic-containing device. It should be noted that a user device 311 can also be directly coupled to any of the networks in some embodiments.

A peripheral 320 or series of peripherals 320, e.g., facsimile machines, printers, scanners, hard disk drives, networked and/or local storage units or systems, etc., can be coupled to one or more of the networks 304, 306, 308. It should be noted that databases and/or additional components can be utilized with, or integrated into, any type of network element coupled to the networks 304, 306, 308. In the context of the present description, a network element can refer to any component of a network.

According to some approaches, methods and systems described herein can be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation can be implemented through the use of VMWARE software in some embodiments.

Figure 4:
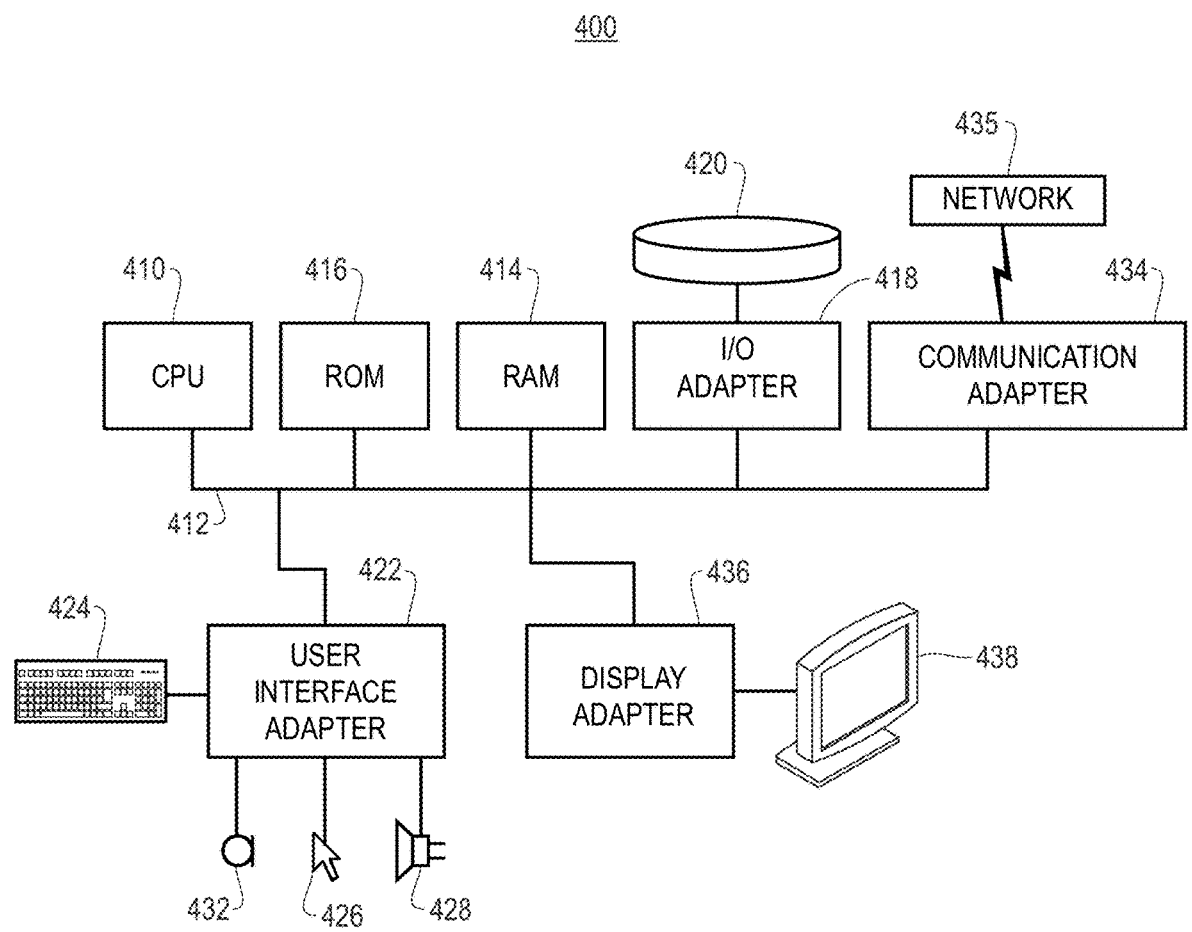
FIG. 4 shows a representative hardware environment that can be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 can include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation can have resident thereon an operating system, such as the MICROSOFT WINDOWS Operating System (OS), a MAC OS, a UNIX OS, etc. In one embodiment, the system 400 employs a POSIX® based file system. It will be appreciated that other examples can also be implemented on platforms and operating systems other than those mentioned. Such other examples can include operating systems written using JAVA, XML, C, and/or C++ language, or other programming languages, along with an object oriented programming methodology. Object oriented programming (OOP), which has become increasingly used to develop complex applications, can also be used.

Figure 5:
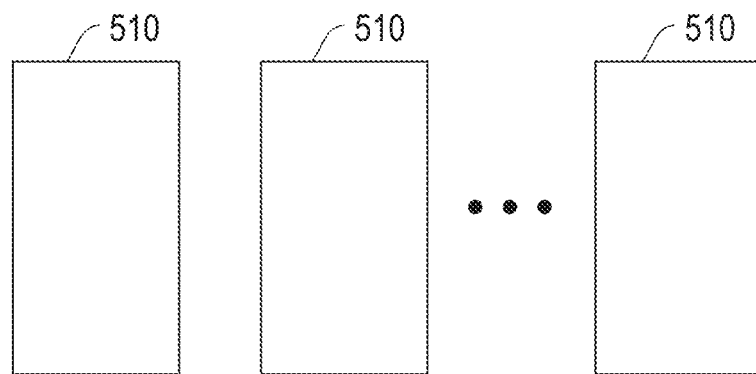
FIG. 5 is a block diagram illustrating a distributed system for extracting relations from unstructured text, according to one embodiment.
Figure 5:
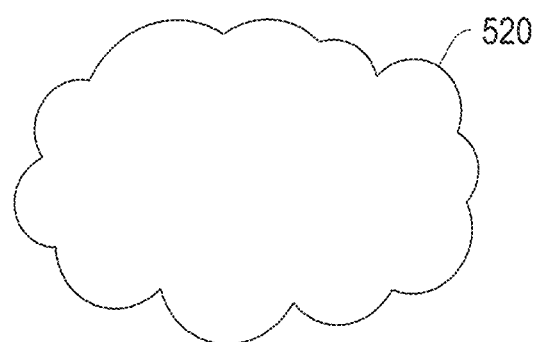
Figure 5:
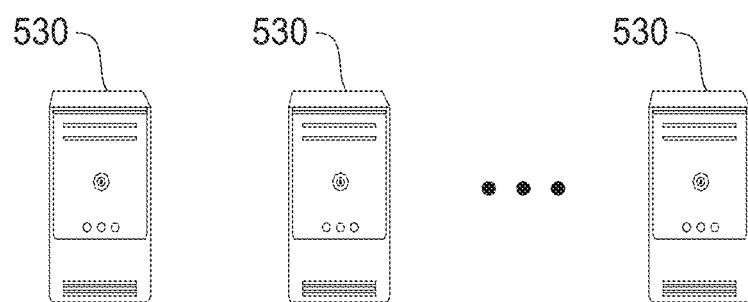

FIG. 5 is a block diagram illustrating a system 500 that can be employed for extracting relations from unstructured text, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500, provides for maximizing the processing bandwidth and memory usage-quality trade-off for relation extraction, given any user-defined relation. Specifically, one embodiment trains NNs in a realistic "human-in-the-loop" setting, where the user defines the relation to extract "by example," annotating a small number of examples, and reduces the annotations needed to reach good performance. The underlying assumption is that the corpus used for extracting relations from contains the relation of interest. System 500 builds a model with the initial examples which is then used to select the next batch of examples for the human (or virtual person, AI processing, etc.) to annotate. A built-in look-ahead method identifies when the model has stopped improving and no more user annotated data is needed.

In one embodiment, system 500 facilitates relation extraction through interaction with an expert, given the constraints defined above, i.e., a fast and language-independent model that is robust to small amounts of data. One embodiment supports two main components: a) an iterative procedure that retrieves the most informative batch of examples for the human to annotate and updates the classification model in each round and b) a stopping criterion for suggestion of terminating the iterative process.

Figure 6:
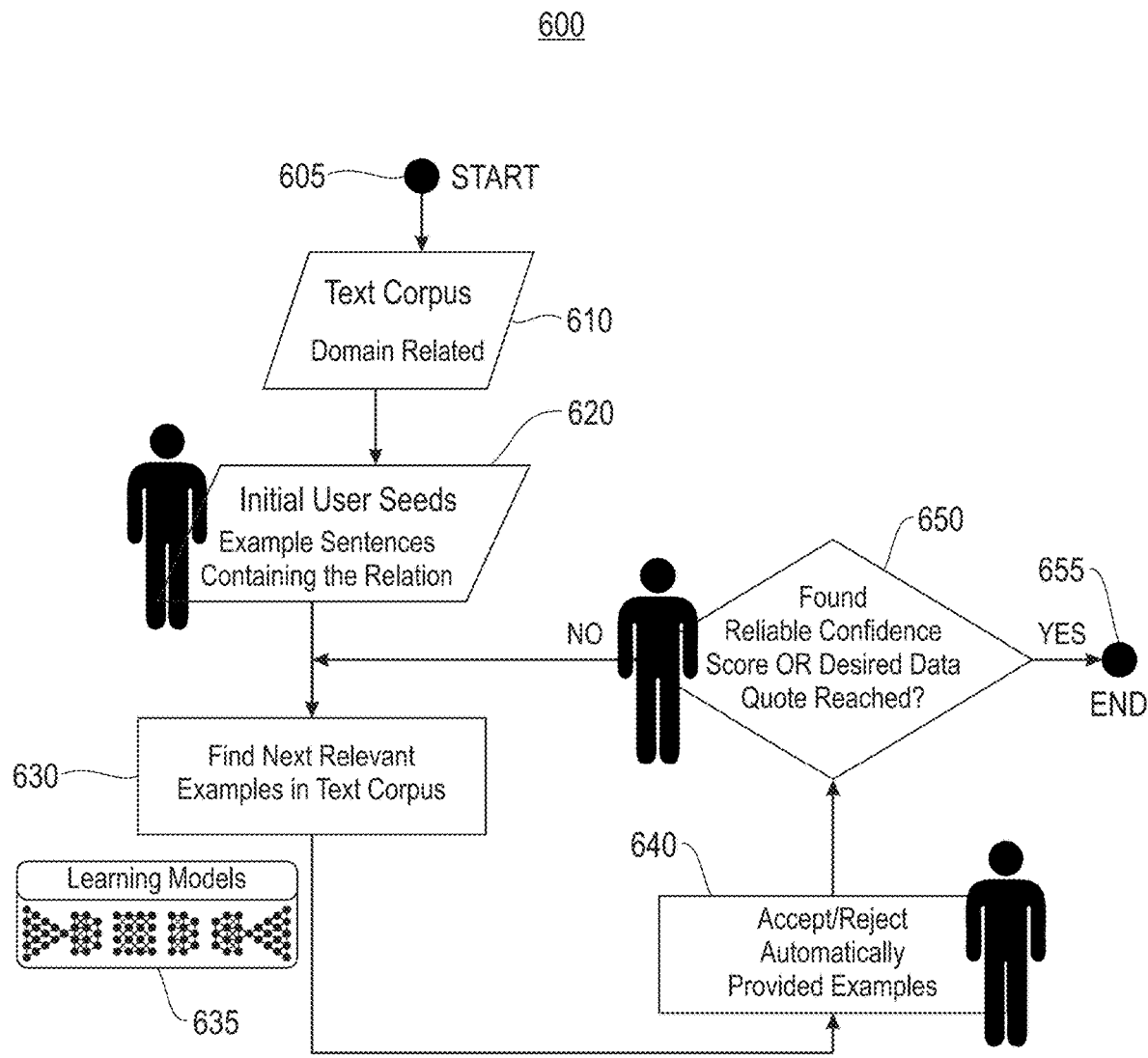
FIG. 6 illustrates an example diagram of a work flow for extracting relations from unstructured text, according to one embodiment.

FIG. 6 illustrates an example diagram of a work flow 600 for extracting relations from unstructured text, according to one embodiment. In one embodiment, work flow 600 includes starting at the start block 605 and proceeding to block 610 where the text corpus is obtained or received, where the text corpus is domain related. In one embodiment, work flow 600 obtains or receives initial user seeds at block 620. In one example, the initial user seeds are example sentences containing the relation. In one embodiment, in block 630 the work flow 600 finds the next relevant examples in the text corpus. In block 630, the work flow 600 creates several representations of text that can capture entity-specific syntactic knowledge without relying on additional lexical or linguistic resources, by: representing the distance of each word from each entity in a continuous vector format; splitting the text into three parts based on the position of the entities or distinguishing between an entity representation and an averaged vector representation for the rest of the words in the text. Block 630 further provides for identifying the next batch of informative examples for the user to annotate by: training an NN classifier on the pool of labeled examples, passing each unlabeled example from the classifier to produce a prediction and a continuous representation for each example (where the representation here is the weights of the final hidden layer), and using a clustering-based AL process in learning models 635 to output examples that are both representative of each cluster and for which the classifier has low confidence on its prediction. In block 640, the work flow 600 provides for automatically accepting or rejecting the provided examples using a human-in-the-loop (or virtual person, AI, etc.). Block 650 provides for determining found reliable confidence score or desired data quote is reached using a human-in-the-loop (or virtual person, AL, etc.). If the determination in block 650 is yes, the work flow 600 proceeds to block 655 and ends/stops. Otherwise, work flow 600 proceeds back to block 630. In one embodiment, in work flow 600 the stopping criteria includes for the batch of examples identified above, where the loss with respect to the parameters is changing is determined or calculated. This basically informs how much the learning model (from learning models 635) would change if the examples were to be added in the work flow 600 for training. If the calculated difference is decreasing after x steps, the work flow 600 suggests to the user to stop annotating more examples. The user is able to control this parameter to trade-off between high performance and low annotation use of system resources (e.g., processing bandwidth and memory usage, etc.). If the stopping criterion has not been reached, the work flow 600 retrains the learning model in block 635 after the batch of examples in block 630 have been labeled and proceeds back recursively.

In one embodiment, the flow diagram is processed using one or more processors (e.g., one or more processors from computing node 10, FIG. 1, processing system 300, FIG. 3, system 400, FIG. 4, system 500, FIG. 5, etc.) used for extracting relations from unlabeled data that minimizes the required annotations, which needs no NLP tools and performs well with respect to conventional applications. These relations can be fairly well defined (e.g., given a color and an object, does the author imply the object is that color) to somewhat more subjective ones (e.g., detecting asserted causal relations between drugs and adverse events). Herein, relation detection is defined in a standard way, i.e., determining if a relation is present in a text sample or not, or in relation extraction terms, the goal is to recognize whether a predefined set of relations holds between two or more entities in a sentence. In one embodiment, an end-to-end system is employed for extracting relations from unstructured content (e.g., Web content, etc.). First, the type of entities involved in the relation, e.g., drugs and adverse events, must be specified—this step can be seen as a blackbox component. Then, the system obtains a relevant pool of potential examples of the relations from, for example, the Web, and social media by selecting sentences where the entities co-occur. In one embodiment, parts of the corpus that seem to contain highly ambiguous data are discarded, while useful data for the task is retained.

In one embodiment, work flow 600 provides an end-to-end process for relation extraction with a human-in-the-loop. In one embodiment, the system generates datasets for relation extraction on any domain and any concept that a user is interested in. In one embodiment, work flow 600 kick-starts arbitrary extraction tasks for which annotated resources are not yet available. The work flow 600 does not have to rely on any NLP tools and is independent of document style and language. In one embodiment, work flow 600 provides for using a combination of AL strategies on neural models and prunes the ones that are not effective for the task at hand. Since one does not know a priori what the optimal strategy is, the work flow 600 learns which strategy among the available ones to use. Processing of work flow 600 works well regardless of the chosen neural architecture. One advantage of using work flow 600 is to rapidly deploy a system that is able to quickly generate high quality train/test data on any relation of interest, regardless of language and text style of the corpus. Given the fact that the work flow 600 provides feedback on performance after every small annotation step (e.g., block 620, block 640 and block 650), the user can decide when to stop annotating when he/she is satisfied with the level of accuracy (e.g., accuracy above 75%, etc.) or decide to stop if he/she understands that the underlying data might not be useful for the task at hand. Work flow 600 also provides for the ability to identify, early in processing, high quality train/test data for challenging relation extraction tasks while minimizing the user annotation effort.

A key to success for machine learning tasks is the availability of high quality annotated data, which is often costly in terms of processing bandwidth and memory usage to acquire. For relation extraction processing, the definition of a relation is highly dependent on the task at hand and on the view of the user, therefore having pre-annotated data available for any specific case is unfeasible. Various approaches have been proposed to minimize the cost of obtaining labelled data, one example being distant supervision, which exploits large knowledge bases to automatically label entities in text. Despite being a powerful technique, distant supervision has many drawbacks including poor coverage for tail entities, as well as the broad assumption that when two entities co-occur, a certain relation is expressed in the sentence. The latter can be especially misleading for unusual relations, where the entities might co-occur but not fit the desired semantic (e.g., a user wants to classify "positive" or desirable side effects of drugs). One way to tackle the problem is to use targeted human annotations to expand the large pool of examples labelled with distant supervision. Another way is to address it as a noise reduction problem, such as exploiting hierarchical clustering of the distantly annotated samples to select the most reliable ones, or to interleave self-training with co-testing. Nonetheless, it is nearly impossible to refrain from manual annotation entirely: at the very least test data (that serves as gold standard) needs to be annotated manually. The question then is how to minimize the human annotation effort.

AL aims at incorporating targeted human annotations in the process: the learning strategy interactively asks the user to annotate certain specific data points, using several criteria to identify the best data to annotate next. Some criteria are: (i) uncertainty sampling, which ranks the samples according to the learning model's belief it will mislabel them; (ii) density weighted uncertainty sampling, which clusters the unlabeled instances to pick examples that the learning model is uncertain for, but also are "representative" of the underlying distribution; (iii) measuring each instance's informativeness and representativeness by its prediction uncertainty, (iv) Bayesian methods, such as BALD (Bayesian Active Learning by Disagreement), which select examples that maximize the model's information gain. The effectiveness of these criteria is highly dependent on the underlying data and the relation to extract and it is very difficult to identify strong connections between any of the criteria and the task. The question then becomes how to decide which technique to use on a new extraction task. In one embodiment, work flow 600 dynamically determines the technique to employ based on the criteria on a task-driven basis. The "active learning by learning" method has an initial phase where all criteria are tested extensively and one is chosen. It is believed that this technique seems to perform the best at the beginning and might not be the best one in the long run. Therefore, in one embodiment the work flow 600 initially distributes the budget of annotation among all considered criteria and discards the worst performing one at each iteration. Keeping a pool of options for a longer number of iterations maximizes performance on average for a larger number of tasks, especially given the very small sample set.

It is worth mentioning that in relation extraction, as in many other machine learning tasks, there is no one-fits-all model and many have been proposed ranging from early solutions based on support vector machines (SVMs) and tree kernels to more recent ones exploiting neural architectures. Neither the model nor the AL strategy or any particular combination is universally (on all relations/all data) "the best" performer. Therefore, in one embodiment, the approach in work flow 600 is a data driven approach. One or more embodiments investigates the influence of different AL strategies on different extraction tasks (regardless of the underlying neural model) and devises strategies to effectively annotate data, rather than proposing a new neural architecture per-se.

In one embodiment, relation extraction is treated as a binary classification task. Given a text snippet s containing one or more target entities $e_i$,$^5$ one goal of the work flow 600 is to identify if s expresses a certain relation r among the entities $e_i$. In one embodiment, work flow 600 creates a relation classification system that gradually increases accuracy from each recognized relation, as well as identifying the sentence snippets for which the system is most/least confident about expressing the desired relation. Therefore, in block 610 the work flow 600 obtains a large pool of relevant unlabeled text from a given social media stream (e.g., the TWITTER® stream, a social forum, etc.), applying the following. The work flow 600 considers the (two) types of entities involved in the relation, for which dictionaries are constructed using any known tools and sentences are selected in block 620 where the (two) entities co-occur. Note that this will produce noisy data, therefore in one embodiment noise reduction is employed in the work flow 600. In one example, entity identification in sentences is treated as a "blackbox" component with various valid available solutions. Then in block 630 the work flow 600 segments the learning process into small steps of b examples at a time (e.g., b=100, etc.) and interactively annotates the data as the learning models 635 are trained. Example refers herein to a text snippet expressing the relation between the entities and annotation refers to manually assigning a "true/false" label to each example. In one embodiment, the work flow 600 selects the first batch of b examples with a curriculum learning strategy and manually annotates them. With those, the work flow 600 trains (i) several neural models, using (ii) two different data representation paradigms and (iii) several active learning strategies to determine the next batch of examples. One goal is not to specifically improve a particular learning model per-se, but rather (i) identifying, at an early stage, i.e., with minimal annotation effort, if a specific relation can be learned from the available data and (ii) minimize the labelling effort by using first examples that are more likely to boost the learning performance. As no active learning strategy is universally preferable, in one embodiment the work flow 600 uses a pruning process that dynamically selects the best strategy for a given task. In one example embodiment, the work flow 600 employs neural models for relation extraction (e.g., CNNs and bi-directional gated recurrent units (GRUs).

Figure 7:
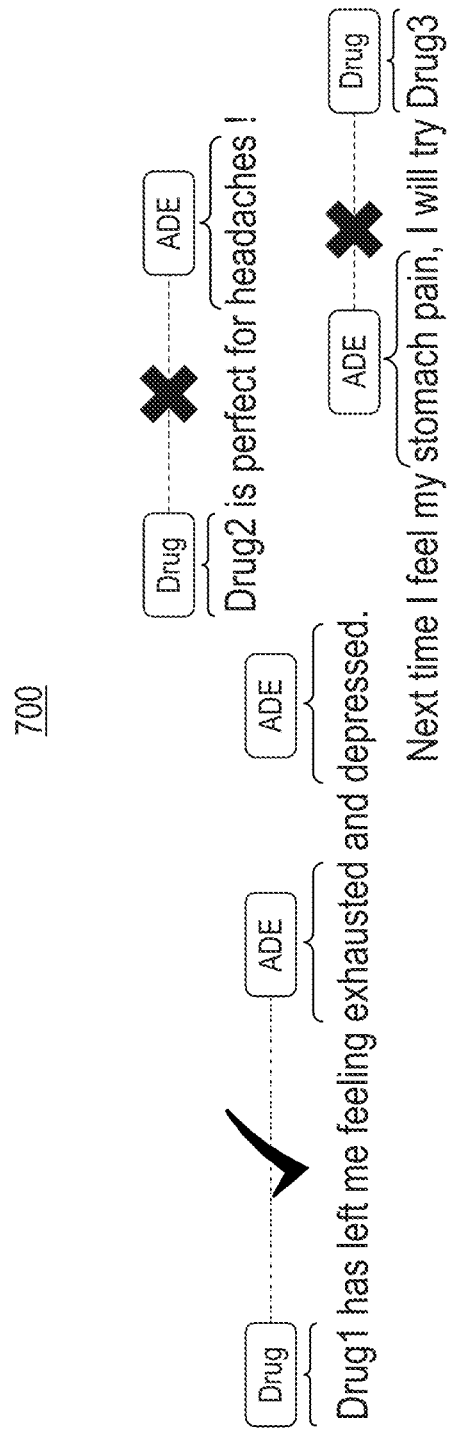
FIG. 7 illustrates examples of causal and non-causal relations between drugs and adverse drug events (ADE) mentions in sentences, according to one embodiment.

FIG. 7 illustrates examples 700 of causal and non-causal relations between drugs and adverse drug events (ADE) mentions in sentences, according to one embodiment. The examples 700 relate to extracting ADE relations from a Web forum (e.g., http://www.askapatient.com/). In this example, the human-in-the-loop is a medical doctor using the system to annotate the data for causal relationships between drugs and ADEs. In one example, posts are tagged based on mentions of certain drugs, ADEs, symptoms, findings, etc. However, the mere co-occurrence of a drug and an ADE in a sentence does not necessarily imply a causal relation among the two. The example 700 shows three sentences, one where the drug caused an ADE (indicated with the check mark) and others where it did not (indicated with an X).

In one embodiment, CNNs are employed because: they are highly expressive leading to low training errors, they are faster in training than recurrent architectures, and known to perform well in relation classification. In one example, a CNNpos is used: word sequences and positional features. In another example, CNNcontext is used: context-wise split sentence. In one embodiment, AL processing can employ the following:

US: (uncertainty) ranking based on model confidence,
DWUS: density weighted uncertainty ranking,
QUIRE: informativeness and representativeness,
BALD: Bayesian active learning by disagreement,
PRUNE: eliminate least efficient learner,
RS: random, etc.

In one or more embodiments, regarding data representation, the processing for extracting relations from unstructured text does not rely on lexical features or any other language-dependent information. In one embodiment, after using a tokenizer (white spaces, punctuations, etc.) the processing for extracting relations from unstructured text exploits distributional semantics—statistical properties of the text data—to ensure portability to different languages, domains and relation types. In one embodiment, two different representations for the text are possible: (i) word sequences concatenated with positional features, i.e., the processing for extracting relations from unstructured text generates three embedding matrices, one initialized with pre-trained word embeddings and two randomly initialized for the positional features; and (ii) a context-wise split of the sentence, i.e., using pre-trained word embeddings and using the two entities in the text as split points to generate three matrices—left, middle and right context.

In one example, as for the NN architectures specifications, the learning models 635 (FIG. 6) can use: 100-dimensional pre-trained global vectors for word representation (GloVe) word embeddings; 100-dimensional positional embeddings optimized with stochastic optimization; initial learning rate=0.001; batch size b=100; validation split=0.2; early stopping to avoid overfitting (if no improvement happens for 5 consecutive iterations). In the one example, for the CNNs the following can be used: 100 filters; kernels width=3; rectified linear units (ReLU) nonlinearities—for CNNs with multiple filter sizes the kernels can be set, for example, width from 2 to 5. For the GRU the following can be employed: ReLU activations and layer size=100.

In one example, at a bootstrapping phase of the processing for extracting relations from unstructured text, the system has no information on the performance of each learning model 635 (FIG. 6) as all data is unlabeled. In one example embodiment, curriculum learning (CL) strategies are employed, where the order of the data is decided in advance—before starting the learning process using several text based criteria. In one embodiment, optimized performance is obtained by maximizing dissimilarity. Starting from a random example (sentence) the system sorts the data as to maximize dissimilarity between the sentences. In one embodiment, the system calculates sentence similarity exploiting GloVe embeddings.

For all subsequent steps, in one embodiment previously annotated examples can be used to test the performance of different AL strategies. A pool-based AL scenario in which there exists a small set of labeled data $L=(x_1, y_1), \ldots, (x_n l, y_n l)$ and a large pool of unlabeled data $U=x_1, \ldots, x_n u$ can be used for testing performance. The task for the active learner is to draw examples to be labeled from U, so as to maximize the performance of the classifier (the neural net) while limiting the number of required annotations to achieve a certain accuracy. In one example, the learning model is trained on the first batch of annotated examples, using k-fold (where k is a positive integer, e.g., k=5, etc.) cross validation on the batch itself. In k-fold cross-validation, the original sample is randomly partitioned into k equal sized subsamples. Of the k subsamples, a single subsample is retained as the validation data for testing the learning model, and the remaining k−1 subsamples are used as training data. At each subsequent iteration b/n examples according to each of the n target active learning strategies, after labelling those b examples the performance is calculated for each of them and the system identifies the worst performing AL strategy, which gets discarded in subsequent iterations. After n iterations, one strategy remains for the particular task. In one example, the system selects n=5 AL strategies: uncertainty sampling (US), density weighted uncertainty sampling (DWUS), Bayesian active learning by disagreement (BALD), QUIRE and as baseline, the random selection (RS) of examples is included. It should be noted that the approach of one or more embodiments is not limited to those strategies—any other strategy can be added without changing the overall framework.

The relation extraction task is a challenging one. Especially in the case of developing early prototype systems, little can be done with a traditional NN in the absence of a significant quantity of hand labeled data. While a task specific labeling system can help, it makes sense to consider the "best order" to ask the user for input in the hopes of achieving a sufficiently performant system with minimal human effort. Assuming the existence of a relevant corpus of unlabeled examples for the relation at hand the aim is to identify the best AL strategy for each extraction task to prioritize the annotation of examples that have a better impact on the learning models 635 (FIG. 6).

Figure 8:
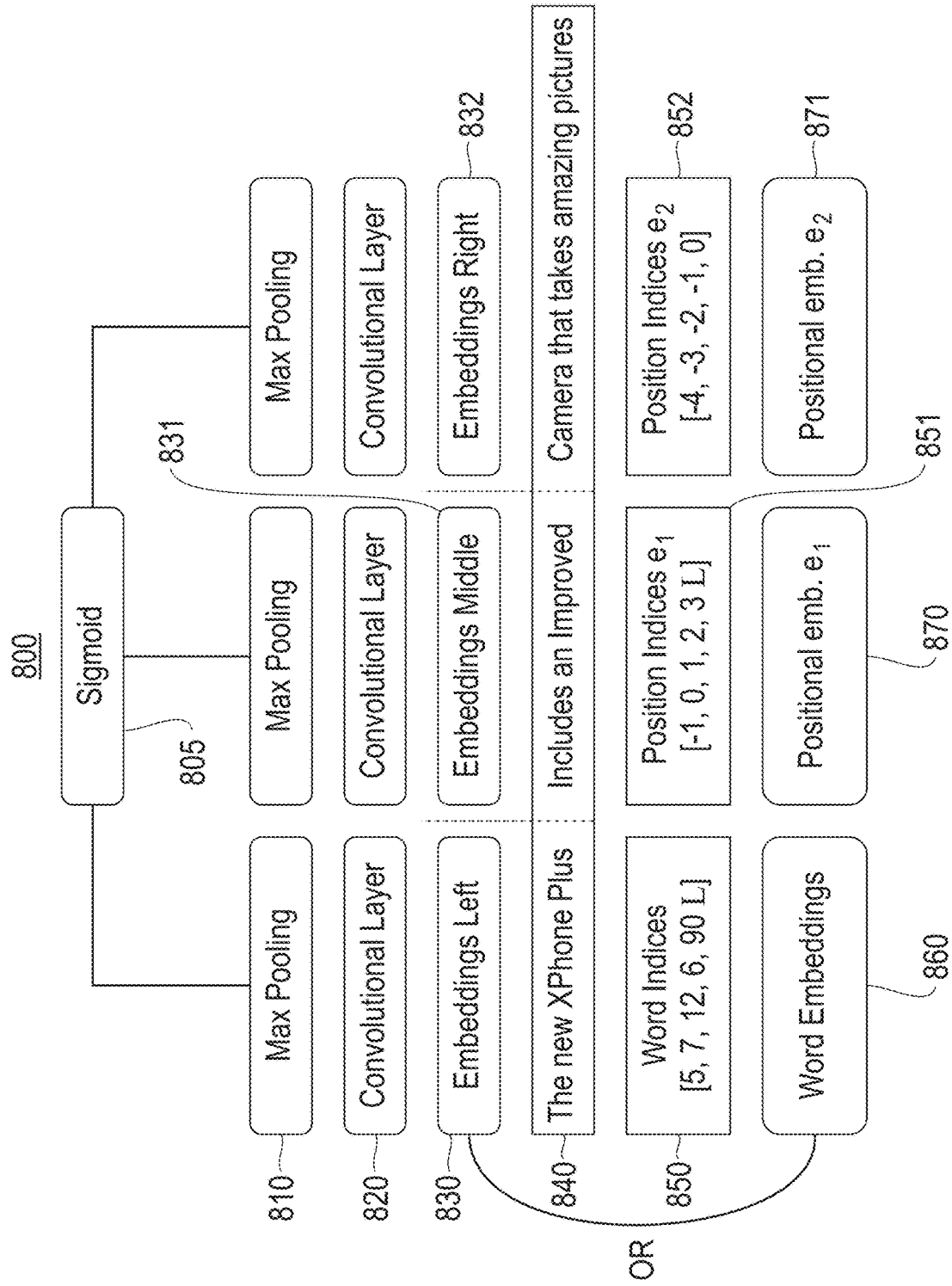
FIG. 8 illustrates an example of data representation for a neural network used for extracting relations from unstructured text, according to one embodiment.

FIG. 8 illustrates an example 800 of data representation for an NN used for extracting relations from unstructured text, according to one embodiment. In one embodiment, the system (e.g., computing node 10, FIG. 1, processing system 300, FIG. 3, system 400, FIG. 4, system 500, FIG. 5, etc.) initially starts building a representation of the unstructured text 840: a) word embeddings 860, positional emb. $e_1$ 870, and positional emb. $e_2$. 871, where each word is indexed, i.e. mapped to a unique integer 850. The distance of each word from entity $e_1$ and entity $e_2$ is calculated and indexed into position indices $e_1$ 851 and position indices $e_2$ 852. Each word index and each position index is also mapped to a specific vector representation. All vectors of each word found in the specific text instance are gathered into an embedding matrix 860. The same processing applies for the position indices, with two matrices 871 and 872 added as embeddings. Another option is b) Splitting the text into three parts based on the positions of entity $e_1$ and entity $e_2$ and thus creating embeddings left 830, embeddings middle 831 and embeddings right 832. The next layer takes these embedding matrices and passes them from convolutional filters 820 and max pooling operations 810. The outcome of 810 is then transformed with a Sigmoid function 805 to output a score indicating whether a relation holds (score close to 1) or not (score close to 0).

In a real case scenario, where all data is unlabeled and a designated test set does not exist, the feedback provided at each step is the performance calculated with cross-validation on the currently annotated data. In one embodiment, the pruning strategy (i) obtains top performance, with respect to other strategies with exhaustive annotation, i.e., when all examples are labelled on most tasks (9 out of 10) and (ii) can consistently "near" top performance (with a loss 2% in most cases (7 out of 10) with less than half of the annotated data, for some relations as early as after 400 annotations.

Regarding neural architecture it is observed that a simple CNN model performed better in most cases, with a preference for the context-wise split data representation. In one embodiment, while the system trains and tests in small batches, active learning by learning (albl) works in a streaming fashion where a micro-training and performance estimation is done after each new example. While this is affordable in albl tested settings (using a SVM model) it becomes computationally heavy in NN settings.

Regarding the pruning processing the system reports which AL strategy is selected (column selection) after the pruning is completed. It is important to note that this is not equivalent to running the selected strategy alone, because the first stages of training include data selected with various techniques, and this contributes to learning a slightly different model than with a single technique. Conventional systems based on relation extraction focus on improving model performance by either developing new architectures, incorporating additional linguistic features or acquiring additional data. In order to be able to capture any domain specific relation, in one embodiment models are designed that take into account the effect of the data size and type in addition to the computational cost in terms of processing bandwidth and memory usage occurring from training under streamed annotations. To this end, neural models are trained with minimal data pre-processing, without using any linguistic knowledge and AL strategy selection. One or more embodiments are effective for the rapid generation of train/test data for ambiguous relations.

Figure 9:
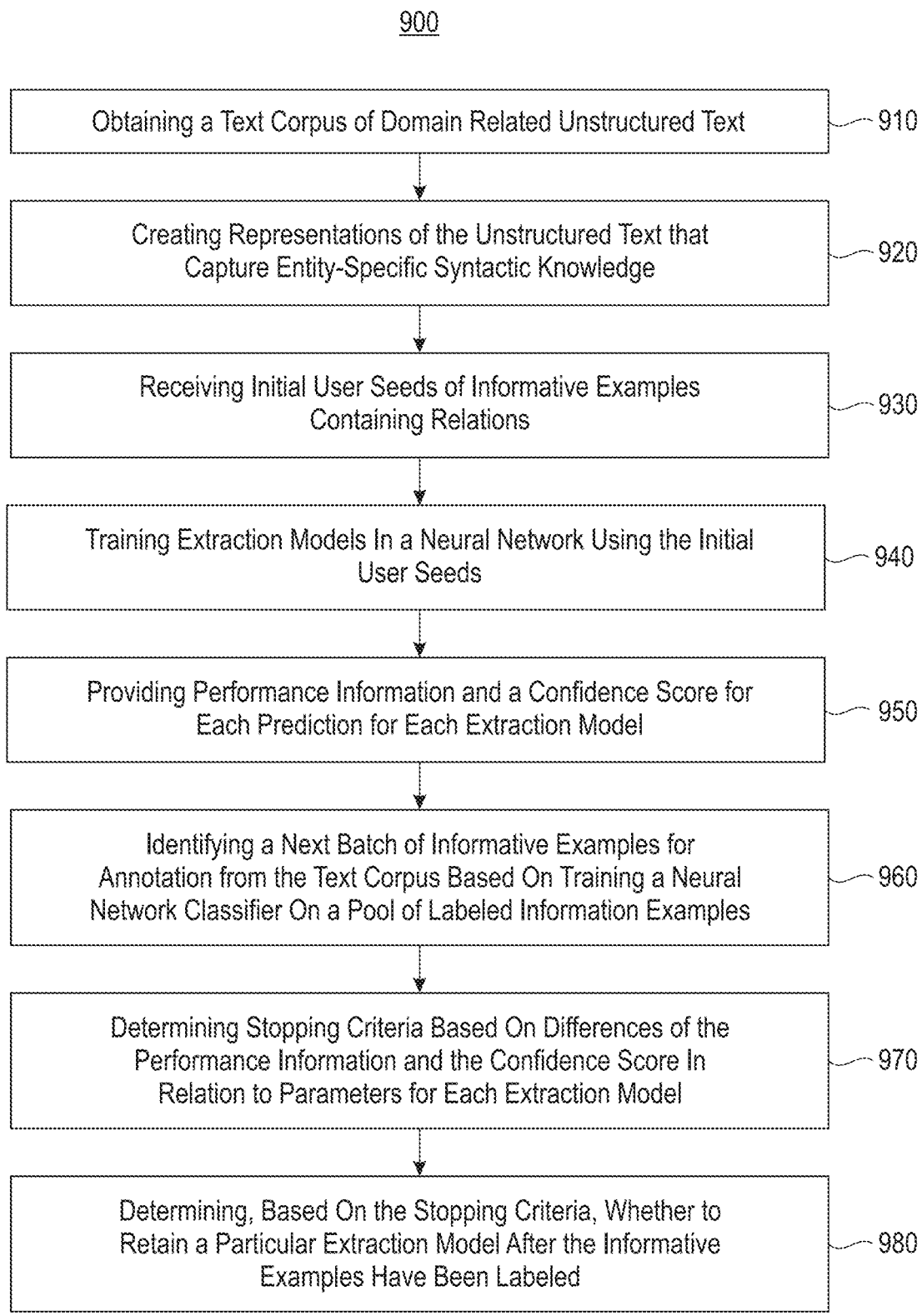
FIG. 9 illustrates a block diagram of a process for extracting relations from unstructured text, according to one embodiment.

FIG. 9 illustrates a block diagram of a process 900 for extracting relations from unstructured text, according to one embodiment. In block 910, process 900 obtains a text corpus of domain related unstructured text (by a processor, e.g., a processor from computing node 10, FIG. 1, processing system 300, FIG. 3, system 400, FIG. 4, system 500, FIG. 5, etc.). In block 920 process 900 creates representations of the unstructured text that capture entity-specific syntactic knowledge. In block 930 process 900 receives initial user seeds of informative examples containing relations. In block 940 process 900 trains extraction models in a neural network using the initial user seeds. In block 950 process 900 provides performance information and a confidence score for each prediction for each extraction model. In block 960 process 900 identifies a next batch of informative examples for annotation from the text corpus based on training a neural network classifier on a pool of labeled informative examples. In block 970 process 900 determines stopping criteria based on differences of the performance information and the confidence score in relation to parameters for each extraction model. In block 980 process 900 determines, based on the stopping criteria, whether to retrain a particular extraction model after the informative examples have been labeled.

In one embodiment, process 900 provides that the representations of the unstructured text that capture entity-specific syntactic knowledge are created without relying on additional lexical or linguistic resources. In one embodiment, in process 900 the creation of the representations of the unstructured text that capture entity-specific syntactic knowledge includes representing distance of each word from each entity in a continuous vector format. In one embodiment, creating the representations of the unstructured text that capture entity-specific syntactic knowledge further includes splitting the unstructured text into three parts based on position of entities.

In one embodiment, in process 900 creating the representations of the unstructured text that capture entity-specific syntactic knowledge further includes distinguishing between an entity representation and an averaged vector representation for the words in the unstructured text.

In one embodiment, in process 900 identifying the next batch of informative examples for annotation from the text corpus further includes: passing each unlabeled example from the neural network classifier to produce a prediction and a continuous representation for each informative example, the representation includes weights of a final hidden layer. A clustering-based active learning process is used to output informative examples that are both representative of each cluster and for which the neural network classifier has a confidence score below a threshold for its prediction.

In one embodiment, in process 900 the performance information and the confidence score of each extraction model includes k-fold cross validation on the initial user seeds, and user selection is provided for selecting an extraction model and selecting a threshold for producing the next batch of informative examples. In one embodiment, in process 900 user control is provided for determining parameters to trade-off between performance information and annotation processing.

One or more embodiments can be applied to many different use cases. The following use cases are some of the examples that can be employed by a system (computing node 10, FIG. 1, processing system 300, FIG. 3, system 400, FIG. 4, system 500, FIG. 5, etc.) for extracting relations from unstructured text.

One embodiment for extracting relations from unstructured text can be applied for E-commerce use cases. Consumers today have the option to purchase products from thousands of e-shops. However, the completeness of the product specifications and the taxonomies used for organizing the products differ across different e-shops. To improve the consumer experience, e.g., by allowing for easy comparison of offers by different vendors, and recommending relevant products to consumers, approaches for product integration on the Web are needed, i.e., identifying matching products across different e-shops and organizing them into a general product catalog. To do so, fine-grained product attribute-value extraction is needed from products text description. However, many times products contain many subcomponents that have their own attributes. One or more embodiments can be implemented to identify if the attribute-value pair refers to the main product or to some of its subcomponent. For example, given the product description, "The new space gray Phone Z has one 12-megapixel camera," the color "space gray" is a value for the attribute "color" for the "Phone", while "12-megapixel" is the value for the attribute "resolution" for the camera of the Phone, which is a subcomponent of the Phone.

One embodiment for extracting relations from unstructured text can be applied for pharmacovigilance use cases. In one embodiment, the system can help to monitor the effects of medical drugs after they have been licensed for use and scout for previously unreported adverse reactions in non-conventional reporting channels such as social media and user blogs.

One embodiment for extracting relations from unstructured text can be applied for corporate brand analysis/marketing use cases. The fact that the processing for one or more embodiments is independent of text style and language while not using any specific natural language processing techniques makes it applicable to different type of user content, spanning from customer reviews to social media posts, etc. The relation extraction can be used by business to inform on what the consumers are talking about with regards to them and their products on social media and alert the company if certain actions need to be taken before it becomes a bigger issue.

One embodiment for extracting relations from unstructured text can be applied for automobile personas use cases. One embodiment can be employed to identify relationships between the automobile that someone drives and their job, hobbies, income, etc. This information is used both to better design future models of those automobiles and as marketing to target potential customers based on the persona of existing customers.

One embodiment for extracting relations from unstructured text can be applied for company profiling use cases. Extracting relations between companies (subsidiary, holding, partner, investor, competitor, etc.) and their divisions, is crucial in analyzing their trading strategies. A stock trader or a business manager can use the system to rapidly learn such relations and easily access the necessary information for assisting decision making.

One embodiment for extracting relations from unstructured text can be applied for legal contracts summarization use cases. One embodiment can be leveraged in teaching a system how to locate deliverables and extract a list of actions that have to be taken in order to accomplish those, as well as extracting specific components, such as legal terms or furniture included on a rental agreement.

One embodiment for extracting relations from unstructured text can be applied for journalism use cases. Keeping track of the teams that won or lost games in sports requires extracting such relations among sport teams automatically. Detecting information about social unrests or attacks, for example the target, the location and date, number of people killed or injured, whether the attacker was also injured or killed, and other relational information about organizations, where the annotation time is crucial and should be taken into account.

One embodiment for extracting relations from unstructured text can be applied for internal corporate business use cases. For example, virtual assistant or chatbot conversation. Clients need to tag action events, relations among them and manually insert the responses. Using one embodiment, the relations between two conversational parts can be automatically extracted, alongside with suggestions for appropriate responses in each case. In another example embodiment, processing for extracting relations from unstructured text can be applied for virtual assistant or chatbot empathy use cases. Personality insights predicts personality characteristics, such as customers' habits and preferences, needs and values through written text, by using linguistic analysis of emails, blogs, tweets and forum posts. One embodiment can be used to extract detailed consumption preferences, user intent for shopping company products and services, as it can learn to discover those products and phrases that represent buying intentions for each product.

One embodiment for extracting relations from unstructured text can be applied for virtual agent use cases. For example, the WATSON® virtual agent produces an analytics dashboard with information about the interactions with customers. One embodiment can enhance the analytics extraction as well as identify answers for domain-specific questions, such as tourism, from free text, to augment the chatbot capabilities.

One embodiment for extracting relations from unstructured text can be applied for virtual agent or chatbot speech use cases. By changing the underlying extraction models of one or more embodiments, the system can potentially identify textual parts that were incorrectly automatically constructed from audio and contain a relation of interest (for example a recording regarding newly available products from competitor companies) and present those examples to a human annotator for correction.

One embodiment for extracting relations from unstructured text can be applied for virtual agent or chatbot discovery use cases. In one example, WATSON® discovery offers a variety of application programming interfaces (APIs). The NLP understanding can extract meta-data from content such as concepts, entities, keywords, categories and relations. The integrated NLP offers enrichment options like concept, relationship, and sentiment. One or more embodiments can aid the process of extracting such information from text, particularly in domain-specific cases where general open domain tools suffer from low performance.

One embodiment for extracting relations from unstructured text can be applied for virtual agent or chatbot knowledge use cases. In one example embodiment, the WATSON® Knowledge Studio is designed for custom annotations that can identify mentions and relationships in unstructured data, which can be used to speed up the relation extraction processing.

One embodiment for extracting relations from unstructured text can be applied for virtual agent or chatbot language translator use cases. The WATSON® translator provides for customizing the translations based on unique terminology and language. Since one or more embodiments are inherently language-independent, one embodiment could be used as a light-weight approach for automated identification of potentially incorrectly translated domain-specific text.

One embodiment for extracting relations from unstructured text can be applied for virtual agent or chatbot language natural language classifier use cases. One embodiment is a classification system that can handle both multi-class and binary classification of relations. Additionally, it can suggest to the user when to stop feeding the classifier with more data, and thus can enhance classification methods where data are constantly streamed.

One embodiment for extracting relations from unstructured text can be applied for virtual agent or chatbot health use cases. Identifying domain-specific relations from user generated text is provided by one or more embodiments. Therefore, in one embodiment the system can extract relational information from unstructured data in the health domain, e.g., causal relations between drugs and adverse drug reactions, disease symptoms and treatments, etc.

One embodiment for extracting relations from unstructured text can be applied for clinical trial matcher use cases. Identifying candidates for clinical trials can be facilitated by identifying relationships of family disease history, effectiveness to medications, etc., contained in their family history of disease and medical history data.

As will be appreciated by one skilled in the art, aspects of the embodiments can be embodied as a system, method or computer program product. Accordingly, aspects of the embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the embodiments can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the embodiments can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. A method of using a computing device executing for on-demand relation extraction from unstructured text, the method comprising:
   receiving, by the computing device, a text corpus of domain related unstructured text from a storage device;
   generating, by the computing device, text representations that capture entity-specific syntactic knowledge from the unstructured text;
   training, by the computing device, a plurality of extraction models in a machine learning neural network using informative sentence examples containing relations, wherein processing of each extraction model results in a prediction as an output;
   generating, by the computing device, performance information and a confidence score from each output of each trained extraction model of the plurality of extraction models;
   training, by the computing device, a neural network classifier on a pool of labeled informative examples, and using output from the trained neural network classifier by the computing device to detect a next batch of informative examples for annotation from the text corpus;
   determining, by the computing device, stopping criteria based on differences between the performance information and the confidence score in relation to model parameters for each trained extraction model of the plurality of extraction models; and
   retraining, by the computing device, a particular trained extraction model based on the determined stopping criteria after the informative examples have been labeled, wherein rapid extraction of expressed relationships and processing is language and style independent.

2. The method of claim 1, wherein the text representations of the unstructured text that capture entity-specific syntactic knowledge from the unstructured text are created by the computing device without relying on additional lexical or linguistic resources.

3. The method of claim 2, wherein generating the text representations of the unstructured text that capture entity-specific syntactic knowledge from the unstructured text comprises modifying distance of each word from each entity into a continuous vector format representation.

4. The method of claim 3, wherein generating the text representations of the unstructured text that capture entity-specific syntactic knowledge from the unstructured text further comprises modifying the unstructured text into three parts based on position of entities.

5. The method of claim 3, wherein generating the text representations of the unstructured text that capture entity-specific syntactic knowledge from the unstructured text further comprises determining, by the computing device, differences between an entity representation and an averaged vector representation for the words in the unstructured text.

6. The method of claim 2, wherein using the output from the trained neural network classifier to detect the next batch of informative examples for annotation from the text corpus further comprises:
   generating, by the computing device, a prediction and a continuous representation for each informative example, wherein each of the continuous representations comprises weights of a final hidden layer; and
   outputting, by the computing device, informative examples that are both representative of each cluster and for which the neural network classifier has a confidence score below a threshold for its prediction based on a clustering-based active learning process.

7. The method of claim 1, further comprising:
   receiving, by the computing device, information for the trained extraction model and a particular threshold for generating the next batch of informative examples;
   wherein the performance information and the confidence score of each trained extraction model comprises k-fold cross validation on the informative examples containing relations.

8. The method of claim 1, further comprising:
   determining, by the computing device, the model parameters for each trained extraction model of the plurality of extraction models that trade-off between performance information and annotation processing.

9. A computer program product for on-demand relation extraction from unstructured text, the computer program product comprising a non-transitory computer readable storage medium having program instructions embodied therewith, the program instructions executable by a processor to cause the processor to:
   receive, by the processor, a text corpus of domain related unstructured text from a storage device;
   generate, by the processor, text representations that capture entity-specific syntactic knowledge from the unstructured text;
   train, by the processor, a plurality of extraction models in a machine learning neural network using informative sentence examples containing relations, wherein processing of each trained extraction model results in a prediction as an output;
   generate, by the processor, performance information and a confidence score from each output of each trained extraction model of the plurality of extraction models;
   train, by the processor, a neural network classifier on a pool of labeled informative examples, and using results from the trained neural network classifier by the processor to detect a next batch of informative examples for annotation from the text corpus;
   determine, by the processor, processing stopping criteria based on differences between the performance information and the confidence score in relation to model parameters for each trained extraction model of the plurality of extraction models; and
   retrain, by the processor, a particular trained extraction model based on the determined stopping criteria after the informative examples have been labeled, wherein rapid extraction of expressed relationships and processing is language and style independent.

10. The computer program product of claim 9, wherein the text representations of the unstructured text that capture entity-specific syntactic knowledge from the unstructured text are created by the processor without relying on additional lexical or linguistic resources.

11. The computer program product of claim 10, wherein generating the text representations of the unstructured text that capture entity-specific syntactic knowledge from the unstructured text comprises modifying distance of each word from each entity into a continuous vector format representation.

12. The computer program product of claim 11, wherein generating the text representations of the unstructured text that capture entity-specific syntactic knowledge from the unstructured text further comprises modifying the unstructured text into three parts based on position of entities.

13. The computer program product of claim 11, wherein generating the text representations of the unstructured text that capture entity-specific syntactic knowledge from the unstructured text further comprises determining, by the processor, differences between an entity representation and an averaged vector representation for the words in the unstructured text.

14. The computer program product of claim 10, wherein using the output from the trained neural network classifier by the processor to detect the next batch of informative examples for annotation from the text corpus further comprises:
   generating, by the processor, a prediction and a continuous representation for each informative example, wherein each of the continuous representations comprises weights of a final hidden layer; and
   outputting, by the processor, informative examples that are both representative of each cluster and for which the neural network classifier has a confidence score below a threshold for its prediction based on a clustering-based active learning process.

15. The computer program product of claim 9, wherein:
the program instructions executable by the processor further cause the processor to:
   receive, by the processor, information for the trained extraction model of the plurality of extraction models and a particular threshold for generating the next batch of informative examples; and
   determine, by the processor, the model parameters for each trained extraction model of the plurality of extraction models that trade-off between performance information and annotation processing;
the performance information and the confidence score of each trained extraction model of the plurality of extraction models comprises k-fold cross validation on the informative examples containing relations.

16. An apparatus comprising:
a memory configured to store instructions; and
a processor configured to execute the instructions to:
   receive a text corpus of domain related unstructured text from a storage device;
   generate text representations that capture entity-specific syntactic knowledge from the unstructured text;
   train a plurality of extraction models in a machine learning neural network using informative sentence examples containing relations, wherein processing of each trained extraction model of the plurality of extraction models results in a prediction as an output;
   generate performance information and a confidence score from each output of each trained extraction model of the plurality of extraction models;
   train a neural network classifier on a pool of labeled informative examples, and using output from the trained neural network classifier by the processor to detect a next batch of informative examples for annotation from the text corpus;
determine stopping criteria based on differences between the performance information and the confidence score in relation to model parameters for each trained extraction model of the plurality of extraction models; and
retrain a particular trained extraction model of the plurality of extraction models based on the determined stopping criteria after the informative examples have been labeled, wherein rapid extraction of expressed relationships and processing is language and style independent.

17. The apparatus of claim 16, wherein:
the text representations of the unstructured text that capture entity-specific syntactic knowledge from the unstructured text are created by the processor without relying on additional lexical or linguistic resources; and
generating the text representations of the unstructured text that capture entity-specific syntactic knowledge from the unstructured text comprises:
   modifying distance of each word from each entity into a continuous vector format representation; and
   modifying the unstructured text into three parts based on position of entities.

18. The apparatus of claim 17, wherein generating the text representations of the unstructured text that capture entity-specific syntactic knowledge from the unstructured text further comprises determining, by the processor, differences between an entity representation and an averaged vector representation for the words in the unstructured text.

19. The apparatus of claim 17, wherein using the results from the trained neural network classifier to detect the next batch of informative examples for annotation from the text corpus further comprises:
- generating, by the processor, a prediction and a continuous representation for each informative example, wherein each of the continuous representations comprises weights of a final hidden layer; and
- outputting, by the processor, informative examples that are both representative of each cluster and for which the neural network classifier has a confidence score below a threshold for its prediction based on a clustering-based active learning process.

20. The apparatus of claim 16, wherein:
the processor is further configured to execute the instructions to:
- receive information for the trained extraction model of the plurality of extraction models and a particular threshold for generating the next batch of informative examples; and
- determining, by the processor, the model parameters for each trained extraction model of the plurality of extraction models that trade-off between performance information and annotation processing; and the performance information and the confidence score of each trained extraction model of the plurality of extraction models comprises k-fold cross validation on the informative examples containing relations.

* * * * *